A. A. STRAUSS.
MACHINE FOR MIXING FLOUR AND OTHER MATERIALS.
APPLICATION FILED FEB. 9, 1916. RENEWED APR. 26, 1921.
1,394,371. Patented Oct. 18, 1921.
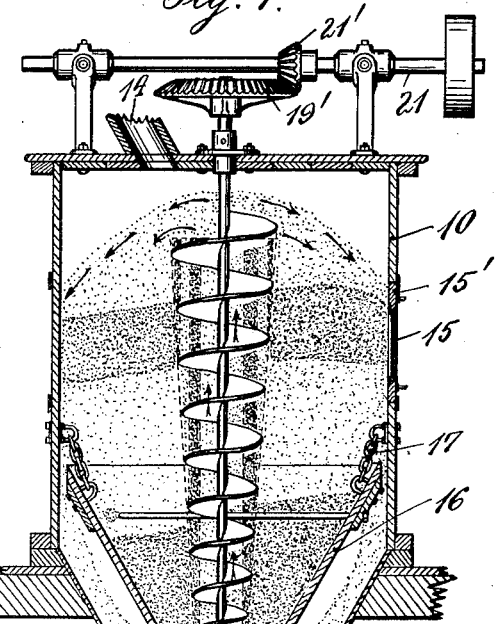
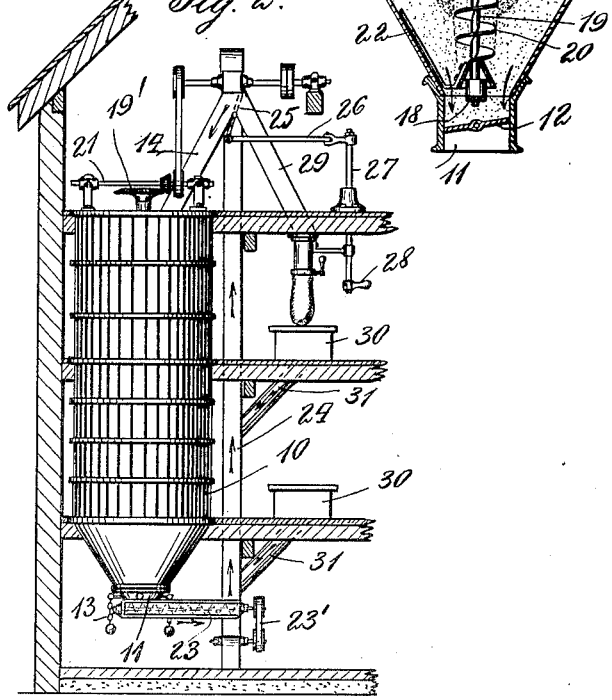
WITNESS:
Charles A. Marks.
INVENTOR
Albert A. Strauss
by John Lotka
Attorney.

UNITED STATES PATENT OFFICE.

ALBERT A. STRAUSS, OF NEW YORK, N. Y.

MACHINE FOR MIXING FLOUR AND OTHER MATERIALS.

1,394,371. Specification of Letters Patent. Patented Oct. 18, 1921.

Application filed February 9, 1916, Serial No. 77,130. Renewed April 26, 1921. Serial No. 464,567.

*To all whom it may concern:*

Be it known that I, ALBERT A. STRAUSS, a citizen of the German Empire, and resident of the borough of Manhattan, city, county, and State of New York, have invented certain new and useful Improvements in Machines for Mixing Flour and other Materials, of which the following is a specification.

The object of my present invention is to provide a simple and efficient machine for mixing flour, bran, fodder and other materials obtained in flour mills and now generally mixed by manual labor. The machine, while designed especially for the mixing of flour mill products, will of course be applicable for mixing other powdery and fine-grained materials.

One of the characteristics of my improved machine is a novel insert or guide coöperating with a mixing screw preferably of peculiar conical or tapering formation, by the use of which the mixing operation is performed very efficiently, yet with the expenditure of little power.

Other features of my invention will be pointed out in the description following hereinafter and in the appended claims.

Reference is to be had to the accompanying drawings, in which Figure 1 is a sectional elevation of my improved mixing machine; and Fig. 2 is a front elevation of the machine provided with means for feeding and delivering material at various floors.

The particular embodiment of my invention illustrated by Fig. 1 comprises a suitable casing 10, generally of cylindrical shape with a conical lower portion leading to the outlet 11 in which is located the valve or damper 12 pivoted at its center and adapted to be operated, say by chain handles 13 such as shown in Fig. 2. The inlet for the material to the upper portion of the casing 10 is indicated at 14, and at 15 I have shown a transparent pane or window through which the interior of the machine may be inspected to a certain extent during the operation; said pane is preferably set in a removable frame 15', for the purpose of affording easy access to the interior of the casing. Within the lower portion of the casing 10 extends a conical insert 16, suspended loosely by means of chains 17 engaging hooks or staples on the casing and on the inside of the insert respectively, and a sufficient annular space or clearance is left between the upper edge of the insert and the inside wall of the casing to allow the material to pass between the insert and the casing, as will be more fully set forth below. These features of the machine may be varied considerably.

At the lower portion of the casing is a step bearing 18 for the shaft 19 of the mixing screw 20. This mixing screw is tapered (preferably conically) from top to bottom, that is to say, its diameter increases progressively from the lower end to the upper end, and the pitch (meaning the distance from one turn or convolution to the next) likewise increases progressively from the bottom to the top. This screw extends from a point below the insert 16, upwardly through the open lower end of the insert (with a material clearance, as shown), and then through the insert and to a point near the top of the casing 10. The shaft 19 is driven in any suitable manner, as by extending it through the top of the casing and mounting on it a bevel wheel 19' in mesh with a pinion 21' on a drive shaft 21. To the lower end of the shaft 19 is preferably secured an upwardly extending inclined arm 22 adapted to travel adjacent to the conical inner wall at the lower portion of the casing, for the purpose of loosening the material, and also, if desired, of facilitating its passage to the outlet when the latter is open.

In operation, the two or more materials to be mixed are introduced into the casing successively, that is to say, first the full complement of one material, then all of the second material, and so on. The drawing, Fig. 1, indicates five different materials placed in the machine and forming superposed layers therein. The desired materials having been introduced, the mixing screw 20 is rotated in such a direction that it will have a lifting action on the material within the casing. The lower end of the screw, which is of smallest diameter, will lift a core from the material at the bottom of the casing. The next wider portion of the screw, which engages the second material (shown within the insert or funnel 16), will cut from said material an annular portion or rather tubular portion immediately surrounding the above-mentioned core, and a similar lifting of a tubular surrounding portion occurs at each of the layers above. Thus, when the material finally reaches the upper end of the mixing screw, the lifted body consists of a core of one material, a surrounding body of a different material, a still larger tubular portion surrounding the second material, and so forth, these several portions being proportioned according to the heights of the several layers of material in the casing or receptacle, and this proportion is constant during the same operation. Inasmuch as the vertical distance between two convolutions of the screw increases progressively from the bottom to the top, it follows that the lower surface of each screw-thread is clear or free, since the height of the column of material cut and lifted by the screw between two successive convolutions, is less than the distance between the next two convolutions above, between which such material comes to lie as it is lifted by the rotation of the screw. The screw can therefore work very easily in the material, and a corresponding saving of power is effected; this is further enhanced by making the shaft 19 very thin, so as to reduce the friction between the material and the said shaft. The material raised to the top of the mixing screw is spread out as indicated in the drawing, partly by centrifugal force, and partly by sliding outward when the heap has become such as to exceed the angle of repose of the material. As material is removed from the central portion of the receptacle by the action of the rotating screw, a further amount of material will of course flow inwardly and downwardly to take the place (in part) of the material thus withdrawn, and gradually the entire contents of the receptacle or casing will become mixed thoroughly. This mixing device is exceedingly efficient, simple, and economical in the use of power.

Large sizes of my improved mixing machine will often be of such dimensions as to extend through several floors of a building, see Fig. 2. In such cases, it may be desirable to provide an arrangement for feeding the material to the machine, or withdrawing it therefrom, at different floors. Thus, from the outlet at the bottom of the casing 10, a conveyer screw or other conveyer located in a box 23 and driven, say by belting 23', may deliver the material to an elevator 24 carrying such material to a point above the mixing machine and delivering such material, according to the position of a swinging gate 25 (controlled by link 26, rock shaft 27, and handle 28) either to a chute 29 leading to the place where the material is to be bagged, or to the inlet 14, so that, if desired, the material can be passed through the machine twice or oftener, although, as a rule, one operation will be amply sufficient. At the two lower floors, I have indicated boxes or bins 30 from which, by means of chutes 31, the material to be mixed may be delivered to the elevator 24, which will then deliver it to the inlet chute 14.

Various modifications may be made without departing from the nature of my invention as set forth in the appended claims.

I claim as my invention:

1. A mixing machine comprising a receptacle for the material to be mixed, an upright mixing screw mounted to turn in said receptacle, an insert surrounding said screw and located within the receptacle at a distance from its inner wall to form an annular chamber therewith, the lower end of the insert being open and at a distance above the bottom of the receptacle so that the space at the bottom of the receptacle, below the lower end of said insert, communicates directly with the lower end of said annular chamber.

2. A mixing machine comprising a receptacle for the material to be mixed, said receptacle having an outlet, an upright mixing screw mounted to rotate in said receptacle, and a loosening device mounted to turn with said screw and extending upwardly adjacent to the inner wall of the receptacle at the outlet portion thereof.

3. A mixing machine comprising a receptacle having a tapering lower portion, a tapering insert suspended loosely within the receptacle and extending within said tapering portion, the lower end of the insert being open and in direct communication with the space between the insert and the tapering portion of the receptacle, and an upright mixing screw extending within the receptacle and through said insert to a point below the insert.

4. A mixing machine comprising a receptacle having a tapering lower portion, a tapering insert spaced from the inner wall of the receptacle and open at the bottom, and extending into the tapering portion of the receptacle, the lower end of said insert being open and in direct communication with the space between the insert and the tapering portion of the receptacle, and an upright rotary mixing screw extending within the receptacle through the said insert to a point below the insert.

5. A mixing machine comprising a receptacle having a tapering lower portion with an outlet, a tapering insert spaced from the inner surface of the receptacle and open at the bottom, an upright rotary mixing screw extending within the receptacle through said insert to a point below the insert, and a loosening device mounted to turn with said screw and located adjacent to the inclined inner surface of the receptacle, below said insert.

6. A mixing machine comprising a receptacle for the material to be mixed, an upright mixing screw extending within said receptacle to rotate therein and having a gradual increase in pitch upwardly, and a downwardly tapering insert surrounding said screw above its bottom, said insert being spaced from the receptacle at its upper end, and having its lower, open end above the lower end of said screw.

7. A mixing machine comprising a receptacle for the material to be mixed, a downwardly-tapering insert in said receptacle and spaced from the walls thereof, and an upright rotary mixing screw extending through said insert and projecting both above and below the same.

8. A mixing machine comprising a receptacle, a rotary upright mixing screw in said receptacle, and a downwardly-tapering insert suspended loosely in the receptacle between the screw and the wall of the receptacle.

9. In a machine for mixing flour and other materials, a receptacle or outer casing, a mixing screw, and an insert forming a guide adapted to direct material which has been mixed by the screw, to a point of the working surface of said screw.

In testimony whereof I have signed this specification.

ALBERT A. STRAUSS.